United States Patent
Izbicki et al.

(10) Patent No.: US 6,593,010 B2
(45) Date of Patent: Jul. 15, 2003

(54) COMPOSITE METALS AND METHOD OF MAKING

(75) Inventors: Anthony John Izbicki, Hamburg, PA (US); Michael Anthony Perricci, Lebanon, PA (US); Jean Charles Bonnel, Bailly (FR)

(73) Assignee: Hood & Co., Inc., Hamburg, PA (US)

( * ) Notice: Subject to any disclaimer, the term of this patent is extended or adjusted under 35 U.S.C. 154(b) by 0 days.

(21) Appl. No.: 09/809,964

(22) Filed: Mar. 16, 2001

(65) Prior Publication Data

US 2002/0168542 A1 Nov. 14, 2002

(51) Int. Cl.$^7$ .................. B32B 15/00; B32B 15/18; H01L 4/00
(52) U.S. Cl. .................. 428/659; 428/676; 428/679; 428/685; 439/886; 439/887
(58) Field of Search ................ 428/659, 685, 428/676, 679; 439/886, 887

(56) References Cited

U.S. PATENT DOCUMENTS

| | | | | |
|---|---|---|---|---|
| 3,630,724 A | * | 12/1971 | Hirayama et al. | 420/581 |
| 4,006,011 A | | 2/1977 | Muzyka et al. | 75/122 |
| 4,090,011 A | | 5/1978 | Barkman et al. | 428/653 |
| 4,129,462 A | | 12/1978 | Korenko | 148/31 |
| 4,383,004 A | * | 5/1983 | Spengler | 148/529 |
| 4,442,182 A | * | 4/1984 | Chart | 148/527 |
| 4,445,943 A | | 5/1984 | Smith, Jr. et al. | 148/12.3 |
| 4,445,944 A | | 5/1984 | Smith, Jr. et al. | 148/12.3 |
| 4,487,743 A | | 12/1984 | Smith et al. | 420/459 |
| 4,491,763 A | * | 1/1985 | Fujinuma et al. | 313/405 |
| 4,685,978 A | | 8/1987 | Smith et al. | 148/142 |
| 4,735,868 A | | 4/1988 | Robinson et al. | 428/675 |
| 4,792,719 A | * | 12/1988 | Ornstein | 313/405 |
| 4,810,310 A | | 3/1989 | Robinson et al. | 148/11.5 |
| 4,818,634 A | | 4/1989 | Bliss | 428/677 |
| 5,370,753 A | * | 12/1994 | Lees et al. | 148/536 |
| 5,402,099 A | | 3/1995 | Ballard et al. | 337/298 |
| 5,486,244 A | | 1/1996 | Caron et al. | 148/554 |
| 5,489,762 A | | 2/1996 | Martin et al. | 219/510 |
| 5,573,860 A | * | 11/1996 | Hirano et al. | 428/616 |
| 5,688,471 A | | 11/1997 | Smith et al. | 420/94 |
| 6,129,795 A | | 10/2000 | Lehockey et al. | 148/608 |

OTHER PUBLICATIONS

M. A. Hunter, Metals Handbook, 8$^{th}$ Edition, vol. 1, p. 816–819 (No date).*

* cited by examiner

*Primary Examiner*—John J. Zimmerman
*Assistant Examiner*—Jason Savage
(74) *Attorney, Agent, or Firm*—Lerner, David, Littenberg, Krumholz & Mentlik, LLP

(57) ABSTRACT

A composite material and a method of making a composite material is disclosed. The composite comprises a core of a precipitation hardenable metal having a coefficient of thermal expansion less than 9 parts per million/° C. in the temperature range of 20° C. to 100° C. The core material is clad with a transition metal or transition metal alloy cladding layer covering at least one surface of the core.

10 Claims, No Drawings

COMPOSITE METALS AND METHOD OF MAKING

FIELD OF THE INVENTION

The present invention relates to composite metal materials. More particularly, the present invention relates to composite metal materials having high electrical conductivity, controlled thermal properties and excellent mechanical properties at high temperatures.

BACKGROUND OF THE INVENTION

Various applications require metals having high electrical conductivity and high strength at elevated temperatures. Such properties are typically not available from a single metal.

Generally, it is difficult to significantly modify the physical properties of alloy metals by adjusting the proportions of the alloy constituents. Composite metal materials, such as composite metal laminates, have been used to provide unique combinations of properties that can be obtained by cladding dissimilar core and clad materials. The resultant materials provide the ability to vary the electrical, mechanical and thermal properties.

Electrically conductive spring materials and members used in making electrically conductive spring contacts in switches and in sockets for mounting integrated circuits on printed circuit boards are examples of applications requiring high electrical conductivity and high strength at elevated temperatures. Other applications for materials having high electrical conductivity and high strength are lead frames for semiconductors. In many applications, electrical connectors are used in extremely high temperature environments. For example, automobile engine compartments include electrical connectors that are exposed to extreme high and low temperatures. Therefore, it is desirable to provide an electrical connector that exhibits improved resistance to stress relaxation at high temperatures.

A variety of materials are used to manufacture electrically conductive springs and connectors. Examples of such material include beryllium copper and copper clad stainless steels. Beryllium copper alloys are used in many applications requiring electrical conductivity and mechanical reliability at high temperatures.

Due to potential concerns about adverse health and environmental effects associated with beryllium and beryllium copper use, it would be desirable to provide a material that did not contain beryllium but still had the desirable electrical and mechanical properties of beryllium copper alloys. However, research has yielded few materials that exhibit the combined properties of electrical conductivity and mechanical reliability over a wide temperature range. Therefore, it would also be desirable to provide a composite material having electrical, thermal and mechanical properties that could be tuned or adjusted over a wide temperature range. It would be particularly advantageous if the properties could be tuned or adjusted by varying the relative proportions of the materials in the composite material and/or by heat treating the material to provide a material that has high mechanical strength and capable of being manipulated into complex shapes.

SUMMARY OF INVENTION

Accordingly, the present invention generally provides a composite material including a core of precipitation hardenable core and a clad including a transition metal or transition metal alloy. As used herein, the term core is not limited to mean that the core is completely surrounded by cladding material. Instead, the term core is used in a broader sense to mean the innermost part of the composite material, and at least one surface of the core is covered by cladding material. For example, in a situation in which a planar composite material is provided, at least two major surfaces of the plane would be covered with cladding material.

Preferably, the precipitation hardenable core material has a coefficient of thermal expansion (CTE) less than about 9 parts per million per ° C. (ppm/° C.) over the temperature range of 20° C. to 100° C. According to one aspect of the invention, the core metal includes 32 to 50 percent by weight of Ni, 1.5 to 3.5 percent by weight of Ti, and 0.05 to 1.0 percent by weight of Al. According to this aspect, the balance of the material includes Fe. Preferably, the core metal includes 35 to 45 percent by weight of Ni, 2 to 3 percent by weight of Ti, and the balance Fe. The core material may also include trace impurities including, but not limited to Mn, Si, C, S, and P. Preferably, each of the trace impurities is present in amount less than one weight percent.

According to another aspect of the invention, the cladding layer metal has a coefficient of thermal expansion greater than 9 ppm/° C. in the temperature range of 20° C. to 100° C. The cladding material preferably includes a metal selected from the group consisting of copper, nickel, zinc and alloys thereof.

In another aspect of the invention, the core material comprises 50% to 90% by volume of the composite material. Preferably, the core material comprises 70% to 90% by volume of the composite material. The coefficient of thermal expansion of the composite is preferably less than about 9 ppm/° C. in the temperature range of 20° C. to 100° C. In addition, according to another aspect, the ratio of the 0.2% offset yield strength to tensile strength of the composite after heat treatment at 750° C. from the annealed condition is less than 0.85.

Another aspect of the invention relates to a method of making a composite material including providing a core of the precipitation hardenable metal described above and at least one layer of a transition metal or transition metal alloy cladding covering at least one surface of the core and roll bonding the core layer and the cladding layer together to form the composite material. Another aspect of the method may further include of annealing the composite material at a temperature between 850° C. and 1000° C. According to another aspect, the invention may include heat treating the composite material at a temperature of 700° C. to 800° C. for at least one-half hour. In a preferred aspect of the invention, the heat treatment is performed so that a gamma phase material is formed during said heat treatment. Preferably, the heat treatment is performed so that the ratio of the 0.2% offset yield strength to tensile strength of the composite after heat treatment from the annealed condition is less than 0.85.

In another aspect, the roll bonding step is performed in a single pass with a thickness reduction of at least 30% and the clad layers comprise at least 20% of the composite by volume. According to this aspect, the core and clad materials are planar, and an equivalent volume of clad material covers both major surfaces of the core.

One advantage of the present invention is that the composite material and the method of making the composite material provide a material that has adjustable or tunable electrical, thermal and mechanical properties. The precipitation hardenable core enables the strength properties of the composite material to be adjusted by heat treating the material. The electrical and thermal properties of the composite material can be adjusted by varying the ratio of the cladding material to the core material.

Additional features and advantages of the invention will be set forth in the description which follows. It is to be understood that both the foregoing general description and the following detailed description are exemplary and are intended to provide further explanation of the invention as claimed.

DETAILED DESCRIPTION

The present invention relates to the discovery of a unique combination of materials to provide a composite having tunable electrical, thermal and mechanical properties. Advantageously, the properties of the material can be tuned by adjusting the volume ratio of the core and cladding materials that form the composite. Alternatively, the properties of the composite can be adjusted by heat treating the material. Of course, the properties of the composite can be optimized by adjusting the relative amounts of the core and cladding materials and by heat treating the composite.

The core material includes a precipitation hardenable material having a coefficient of thermal expansion less than about 9 ppm/° C. over the temperature range of about 20° C. to about 100° C. The cladding material includes a transition metal element or an alloy of transition elements, such as Cu, Ni, Zn, Au, and Ag. The cladding material has a coefficient of thermal expansion preferably greater than about 9 ppm/° C.

As used herein, the terms precipitation hardenable and precipitation hardening broadly refers to altering the strength and hardness of materials, particularly metal materials, by heat treating the materials. More specifically, as is known in the art, precipitation hardening of a material involves heat treating a material containing more than one element so that fine dispersed particles of a second phase form during heat treatment, which usually increases the strength and hardness of the material.

An example of a precipitation hardenable material that is suitable for use as a core material in the present invention is an iron alloy material containing nickel and two or more elements capable of forming a second phase during heat treatment along with trace levels of impurities. Examples of impurities include, but are not limited to manganese, silicon, carbon, sulfur and phosphorus. When an iron alloy of this type comprising nickel, titanium and aluminum is precipitation hardened by heat treatment, a gamma (γ) phase material including nickel, titanium and aluminum is formed. Preferably, the core metal contains 32 to 50 percent by weight of Ni, 1.5 to 3.5 percent by weight of Ti, 0.05 to 1.0 percent by weight of Al, and the balance of the material including Fe. More preferably, the core metal includes 35 to 45 percent by weight of Ni, 2 to 3 percent by weight of Ti, less than 1.0 percent by weight of Al, and the balance Fe. The core material may also include trace impurities including, but not limited to Mn, Si, C, S, and P. An example of such a commercially available precipitation hardenable material is Gammaphy®, which is manufactured and sold by the assignee of the present invention.

According to the present invention, the precipitation hardenable core material is clad with a transition metal or transition metal alloy. Particularly suitable clad materials are nickel and copper and alloys containing nickel and copper. Preferably, the core material comprises at least about 50% by volume of the composite core clad material, and more preferably, the core material comprises between about 70% and 90% by volume of the composite material. Cladding of the transition metal material can be accomplished by any suitable method known in the art such as roll bonding.

The invention is further illustrated by the following examples, which are intended to be illustrative, and not in any way limiting, to the claimed invention. The electrical and mechanical properties of the composite materials were compared with beryllium copper alloys used for a variety of applications, such as, for example, electrical connectors.

In Table I, alloy 172 is commercially available beryllium copper alloy number C17200 and alloy 175 is commercially available beryllium copper alloy number C17500. Beryllium copper materials are available in a wide variety of compositions, each of which provides a specific set of properties for a given temperature condition. In the column labeled "temper," "A" refers to an alloy that is formed from cold rolling and annealed and "AT" refers to an alloy heat treated from the annealed condition.

TABLE I

| Alloy | Temper | Ultimate Tensile Strength (MPA) | 0.2% Yield Strength (MPA) | Elongation % at Break |
|---|---|---|---|---|
| 172 | A annealed at 800° C. | 482 | 220 | 45 |
| 172 | AT heat treated at 315° C. 1 hour | 1206 | 1068 | 6 |
| 175 | A annealed at 900° C. | 310 | 172 | 28 |
| 175 | AT heat treated at 485° C. 1 hour | 758 | 620 | 12 |

Although beryllium copper alloys can be heat treated from cold roll condition, to provide desirable mechanical properties, these alloys as mill hardened generally exhibit poor formability.

In Table II, the properties of Gammaphy® are provided for comparison with the properties of the examples in which Gammaphy® is clad with transitional metal. Gammaphy® is commercially available from the assignee of the present invention. The Gammaphy used to obtain the information in Table II included 42.3% Ni, 0.2% Al, 2.6% Ti, and impurities including less than 1% Mn, less than 1% Si, less than 0.2% Al, less than 0.1% C, less than 0.05% S, and less than 0.05% P, with the balance of the material comprising Fe. The percentages of the constituents are in weight percent. The electrical conductivity of the Gammaphy® sample was 2.2% IACS and the coefficient of thermal expansion over the temperature range of 20° C. to 100° C. was 3.9 ppm/° C.

TABLE II

| Sample | Tensile Strength M Pa | 0.2% Yield Strength M Pa | Elongation % at Break | Condition |
|---|---|---|---|---|
| 1 | 1120 | 827 | 16 | Heat Treat at 730° C. for 1 hour, air cool |

TABLE II-continued

| Sample | Tensile Strength M Pa | 0.2% Yield Strength M Pa | Elongation % at Break | Condition |
|---|---|---|---|---|
| 2 | 850 | 830 | 4 | Cold Roll 50% thickness reduction from anneal |
| 3 | 450 | 280 | 29.5 | Annealed at 950° C. |

EXAMPLE I

Samples of copper and Gammaphy® having the same chemistry as in Table II were obtained. A core of planar Gammaphy® material was clad on its major surfaces with the copper. The volume of core material was about 80% of the total volume and approximately equivalent volumes of copper (10% each) were clad to each major surface of the Gammaphy® material. The electrical conductivity of this sample was about 22% IACS, and the coefficient of thermal expansion for this sample over the temperature range of 20° C. to 100° C. was about 4.5 ppm/° C. After roll bonding the core and cladding together, one sample was processed to 50% cold roll reduction of original thickness, a second sample at 50% cold roll reduction was annealed at 950° C., and a third sample at 50% cold roll reduction was heat treated at 730° C. for one hour and air cooled. Table III shows the mechanical properties of the three samples.

TABLE III

| Sample | Tensile Strength (MPa) | 0.2% Yield Strength (MPa) | Elongation % at Break | Condition |
|---|---|---|---|---|
| 1 | 1020 | 780 | 9 | Heat Treat 730° C. show |
| 2 | 892 | 870 | 2 | Cold Roll 50% |
| 3 | 640 | 380 | 29 | Annealed 950° C. |

EXAMPLE II

In this Example, a planar shaped core of Gammaphy® having the same chemistry as shown in Table II was provided. The core provided 50% of the composite by volume and approximately valent volumes (25% and 25%) of purity copper were clad to each major surface of the core by roll bonding. The composite material had an electrical conductivity of 49% IACS and a coefficient of thermal expansion of 4.8 ppm/° C. in the temperature range of 20° C. to 100° C. After roll bonding the core and cladding together, one sample was processed to 50% cold roll reduction of original thickness, a second sample at cold roll reduction was annealed at 950° C., and a third sample at 50% cold roll reduction was heat treated at 730° C. for one hour and air cooled. The mechanical properties of these three samples are shown in Table IV.

TABLE IV

| Sample | Tensile Strength (MPa) | 0.2% Yield Strength (MPa) | % Elongation at Break | Condition |
|---|---|---|---|---|
| 4 | 700 | 500 | 10 | Heat Treat 730° C. |
| 5 | 706 | 656 | 1.5 | Cold Roll 50% |
| 6 | 582 | 320 | 27 | Anneal 950° C. |

EXAMPLE III

In this Example, a planar shaped core of Gammaphy® having the same chemistry as shown in Table II was provided. The core provided 88% of the composite by volume and approximately equivalent volumes (11% and 11%) of high purity nickel were clad to each major surface of the core by roll bonding. The composite material had an electrical conductivity of 6% IACS and a coefficient of thermal expansion of 4.5 ppm/° C. in the temperature range of 20° C. to 100° C. After roll bonding the core and cladding together, one sample was processed to 50% cold roll reduction of original thickness, a second sample at 50% cold roll reduction was annealed at 950° C., and a third sample at 50% cold roll reduction was heat treated at 730° C. for one hour and air cooled. The mechanical properties of these three samples are shown in Table V.

TABLE V

| Sample | Tensile Strength (MPa) | 0.2% Yield Strength (MPa) | Elongation % at Break | Condition |
|---|---|---|---|---|
| 7 | 1002 | 714 | 13 | Heat Treat 730° C. |
| 8 | 799 | 740 | 5.4 | Cold Roll 50% |
| 9 | 596 | 313 | 37 | Anneal 950° C. |

An advantage of the copper or nickel clad Gammaphy® composites is that the CTE of the composition is close to the CTE many frequently used semiconductor substrate materials, whereas the CTE of BeCu and other candidate materials for electronic applications is much greater than the CTE of many semiconductor base materials. The lower CTE of copper clad Gammaphy® results in less geometric and force variance with temperature change than that experienced with BeCu and other materials.

Preferably, the properties of the clad composite are selected so that the ratio of the ultimate tensile strength of the heat treated clad to that the heat treated, precipitation hardenable core material is greater than about 0.6. Also, it is preferred that the ratio of percent elongation in tensile break of the heat precipitation hardenable core material is greater than about 0.5. It is also desired that the ratio of the 0.2% offset yield strength in tensile of the composite to that of the ultimate tensile strength of the composite material is greater than about 0.85. In these cases, the heat treated condition refers to heat treat from the annealed condition.

The above examples demonstrate the wide range of mechanical, electrical and thermal properties that can be obtained by the composite material and the method of making the composite material of the present invention. Adjustment of the relative volumes of the core and cladding materials alters the electrical and thermal properties, and heat treatment alters the mechanical properties of the composite material. The properties can be tailored to a wide variety of specifications and particular applications.

It will be apparent to those skilled in the art that various modifications and variations can be made to the present invention without departing from the spirit or scope of the invention. For example, although the present invention has been described in connection with the production of a strip, it will be understood that other processes may be utilized to produce a composite material in the form of a wire, a block of material or other shape within the spirit and scope of the present invention. In addition, a wide variety of precipitation hardenable materials may be utilized as the core material. Preferably, the core material selected will have a coefficient of thermal expansion less than about 9 ppm/° C. Thus, it is intended that the present invention cover the modifications and variations of this invention provided they come within the scope of the appended claims and their equivalents.

What is claimed is:

1. A composite comprising:
    a core of a precipitation hardenable metal having a coefficient of thermal expansion less than 9 parts per million/° C. in the temperature range of 20° C. to 100° C.; and
    a transition metal or transition metal alloy cladding layer covering each major surface of said core.

2. The composite of claim 1, wherein the core metal comprises nickel and two or more elements capable of forming a second phase during heat treatment.

3. The composite of claim 2, wherein the core metal comprises 32 to 50 percent by weight of Ni, 1.5 to 3.5 percent by weight of Ti, 0.05 to 1.0 percent by weight of Al, and the balance Fe.

4. The composite of claim 3, wherein the cladding layer metal has a coefficient of thermal expansion greater than 9 parts per million/° C. in the temperature range of 20° C. to 100° C.

5. The composite of claim 3, wherein the core metal comprises 35 to 45 percent by weight of Ni, 2 to 3 percent by weight of Ti, less than 1 percent of Al and the balance Fe, and the cladding layer comprises a metal selected from the group consisting of copper, nickel, zinc and alloys thereof.

6. The composite of claim 5, wherein the core material comprises 50% to 90% by volume of the composite material.

7. The composite of claim 6, wherein the core material comprises 70% to 80% by volume of the composite material.

8. The composite of claim 7, wherein the coefficient of thermal expansion of the composite is less than 9 parts per million/° C. in the temperature range of 20° C. to 100° C.

9. The composite of claim 7, wherein the ratio of the 0.2% offset yield strength to tensile strength of the composite after heat treatment from the annealed condition is less than 0.85.

10. An electrical connector or spring made of a composite material comprising:
    a core of a precipitation hardenable metal comprising 32 to 50 percent by weight of Ni, 1.5 to 3.5 percent by weight of Ti, 0.05 to 1.0 percent by weight of Al, and the balance Fe; and
    a transition metal or transition metal alloy cladding covering each major surface of said core, wherein said transition metal or transition metal alloy cladding and said core are roll-bonded together.

* * * * *

UNITED STATES PATENT AND TRADEMARK OFFICE
CERTIFICATE OF CORRECTION

PATENT NO. : 6,593,010 B2  
DATED : July 15, 2003  
INVENTOR(S) : Anthony Izbicki et al.

It is certified that error appears in the above-identified patent and that said Letters Patent is hereby corrected as shown below:

<u>Column 4,</u>
Line 48, after "Gammaphy" insert -- ® --.

<u>Column 5,</u>
Line 63, after "at" insert -- 50% --.

Signed and Sealed this

Twenty-fifth Day of November, 2003

JAMES E. ROGAN
*Director of the United States Patent and Trademark Office*